US010718619B2

(12) United States Patent
Wang

(10) Patent No.: US 10,718,619 B2
(45) Date of Patent: Jul. 21, 2020

(54) NAVIGATION METHOD, APPARATUS, STORAGE MEDIUM AND DEVICE

(71) Applicant: Baidu Online Network Technology (Beijing) Co., Ltd., Beijing (CN)

(72) Inventor: Liuqiang Wang, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 0 days.

(21) Appl. No.: 15/759,117

(22) PCT Filed: Dec. 10, 2015

(86) PCT No.: PCT/CN2015/096982
§ 371 (c)(1),
(2) Date: Mar. 9, 2018

(87) PCT Pub. No.: WO2017/041376
PCT Pub. Date: Mar. 16, 2017

(65) Prior Publication Data
US 2018/0283875 A1 Oct. 4, 2018

(30) Foreign Application Priority Data

Sep. 9, 2015 (CN) .......................... 2015 1 0569808

(51) Int. Cl.
*G01C 21/20* (2006.01)
*G01C 21/34* (2006.01)
(Continued)

(52) U.S. Cl.
CPC ....... *G01C 21/206* (2013.01); *G01C 21/3461* (2013.01); *G01C 21/3605* (2013.01);
(Continued)

(58) Field of Classification Search
CPC .. G01C 21/20; G01C 21/206; G01C 21/3461; G01C 21/3605; G06Q 10/047;
(Continued)

(56) References Cited

U.S. PATENT DOCUMENTS

| 4,074,225 A * | 2/1978 | Vandeweghe | ............ A62B 3/00 |
| | | | 340/329 |
| 9,080,883 B2 * | 7/2015 | Frey | ........................ G08B 7/066 |

(Continued)

FOREIGN PATENT DOCUMENTS

| CN | 103278171 A | 9/2013 |
| CN | 103312875 A | 9/2013 |

(Continued)

OTHER PUBLICATIONS

International Search Report dated Jun. 15, 2016 for International Application No. PCT/CN2015/096982, 8 pages.
(Continued)

*Primary Examiner* — Thomas G Black
*Assistant Examiner* — Ce Li Li
(74) *Attorney, Agent, or Firm* — Knobbe, Martens, Olson & Bear, LLP

(57) ABSTRACT

The present disclosure discloses a navigation method and an apparatus, and a storage medium and a device. The method comprises: obtaining a navigation start instruction for a set function; searching a navigation rule corresponding to the set function and locating a current position of a terminal according to the navigation start instruction; and forming a navigation route according to the current position and the navigation rule. The navigation method provided by the present disclosure, by obtaining a navigation start instruction for a set function, searching a navigation rule corresponding to the set function and locating a current position of a terminal according to the navigation start instruction,
(Continued)

forms a navigation route according to the current position and the navigation rule. The navigation rule for the set function is set in advance, therefore, the users does not need to select origin and destination by clicking, or perform other operations, so that the navigation route may be formed quickly and navigation time is saved.

11 Claims, 9 Drawing Sheets

(51) Int. Cl.
| | |
|---|---|
| *G01C 21/36* | (2006.01) |
| *G06Q 10/04* | (2012.01) |
| *G08B 7/06* | (2006.01) |
| *H04W 64/00* | (2009.01) |

(52) U.S. Cl.
CPC ........... *G06Q 10/047* (2013.01); *G08B 7/066* (2013.01); *H04W 64/00* (2013.01)

(58) Field of Classification Search
CPC ...... G06Q 90/205; G08B 7/062; G08B 7/066; H04L 67/18; H04M 2242/30; H04W 4/90; H04W 64/00; H04W 76/50
See application file for complete search history.

(56) References Cited

U.S. PATENT DOCUMENTS

| | | | |
|---|---|---|---|
| 9,683,856 B2 * | 6/2017 | Iyer | G01C 21/3415 |
| 9,792,788 B2 * | 10/2017 | Joseph | G08B 7/066 |
| 9,799,205 B2 * | 10/2017 | Wedig | G08B 25/016 |
| 2003/0109263 A1 | 6/2003 | Sziraki et al. | |
| 2006/0100782 A1 * | 5/2006 | Levi | G01C 5/06 |
| | | | 701/468 |
| 2010/0057354 A1 * | 3/2010 | Chen | G01C 21/20 |
| | | | 701/533 |
| 2010/0309004 A1 * | 12/2010 | Grundler | A62B 3/00 |
| | | | 340/588 |
| 2011/0136463 A1 * | 6/2011 | Ebdon | G01C 21/20 |
| | | | 455/404.1 |
| 2012/0315918 A1 * | 12/2012 | Kadous | H04W 4/021 |
| | | | 455/456.1 |
| 2015/0006100 A1 * | 1/2015 | Jackson | G01C 5/06 |
| | | | 702/94 |
| 2016/0180663 A1 * | 6/2016 | McMahan | G08B 25/08 |
| | | | 340/691.6 |
| 2017/0024839 A1 * | 1/2017 | Klein | H04W 4/90 |
| 2017/0032632 A1 * | 2/2017 | Joseph | G08B 7/066 |
| 2017/0082445 A1 * | 3/2017 | Tanabe | H04W 4/029 |
| 2017/0345265 A1 * | 11/2017 | Zhao | G08B 7/066 |
| 2019/0020978 A1 * | 1/2019 | Finschi | H04W 4/029 |

FOREIGN PATENT DOCUMENTS

| | | |
|---|---|---|
| CN | 103776452 A | 5/2014 |
| CN | 104606836 A | 5/2015 |
| CN | 104717291 A | 6/2015 |
| CN | 104913779 A | 9/2015 |
| CN | 105180923 A | 12/2015 |
| JP | 2000-334055 A | 12/2000 |
| JP | 2001-251674 A | 9/2001 |
| JP | 2003240591 A | 8/2003 |
| JP | 2004-144695 A | 5/2004 |
| JP | 2005-17027 A | 1/2005 |
| JP | 2006-72411 A | 9/2007 |
| JP | 2010-101838 A | 1/2010 |
| JP | 2012-252683 A | 12/2012 |
| JP | 2013-211003 A | 10/2013 |
| JP | 2014-66576 A | 4/2014 |
| JP | 2015118018 A | 6/2015 |
| JP | 2016173309 A * | 9/2016 |
| KR | 101141740 B1 | 5/2012 |
| KR | 10-2014-0137068 A | 12/2014 |
| WO | 2015/046310 A1 | 4/2015 |

OTHER PUBLICATIONS

Written Opinion of the International Searching Authority dated Jun. 15, 2016 for International Application No. PCT/CN2015/096982, 13 pages.

* cited by examiner

NAVIGATION METHOD, APPARATUS, STORAGE MEDIUM AND DEVICE

CROSS-REFERENCE TO RELATED APPLICATION

This application the U.S. National Phase Application under 35 U.S.C. § 371 of International Application No. PCT/CN2015/096982, filed Dec. 10, 2015, designating the U.S. and published as WO 2017/041376 A1 on Mar. 16, 2017 which claims priority to Chinese Application No. 201510569808.6, filed on Sep. 9, 2015, entitled "Navigation Method and Apparatus," the entire disclosure of each of which is hereby incorporated by reference.

TECHNICAL FIELD

Embodiments of the present disclosure relate to the field of communication technology, and more particularly to a navigation method, an apparatus, a storage medium and a device.

BACKGROUND

When afire or other accidents occurs in a large shopping mall or at a transportation hub, elevator or escalator facilities cannot be used. People in panic may easily face situations where stairs cannot be found, or a detour was necessary.

In the conventional navigation techniques, origin and destination are generally selected manually, before the routes are planned. The routes include all possible means that can reach the destination. When an accident occurs, due to the panic, users will likely click wrong points or select an exit not through the shortest route, thus wasting time during the emergency evacuation.

SUMMARY

Embodiments of the present disclosure provide a navigation method, an apparatus, a storage medium and a device, to implement convenient navigation functions in an emergency evacuation environment.

In a first aspect, the embodiments of the present disclosure provide a navigation method, comprising:

obtaining a navigation start instruction for a set function;

searching a navigation rule corresponding to the set function, and locating a current position of a terminal according to the navigation start instruction; and forming a navigation route according to the current position and the navigation rule.

In a second aspect, the embodiments of the present disclosure provide a navigation apparatus, comprising:

a navigation start instruction obtaining module for obtaining a navigation start instruction for a set function;

a terminal locating module for searching a navigation rule corresponding to the set function and locating a current position of a terminal according to the navigation start instruction; and a navigation route forming module for forming a navigation route according to the current position and the navigation rule.

In a third aspect, the embodiments of the present disclosure provide a non-volatile computer storage medium, the computer storage medium storing one or more modules, when the one or more modules are executed by a device that performs a navigation method, the device is caused to perform the following operations:

obtaining a navigation start instruction for a set function;

searching a navigation rule corresponding to the set function and locating a current position of a terminal according to the navigation start instruction; and forming a navigation route according to the current position and the navigation rule.

In a fourth aspect, the embodiments of the present disclosure further provide a device, comprising:

one or more processors;

a memory; and one or more programs stored in the memory and configured to, when executed by the one or more processors, to perform the following operations:

obtaining a navigation start instruction for a set function;

searching a navigation rule corresponding to the set function and locating a current position of a terminal according to the navigation start instruction; and forming a navigation route according to the current position and the navigation rule.

The navigation method, apparatus, storage medium and device provided in the embodiments of the present disclosure include: obtaining a navigation start instruction for a set function, searching a navigation rule corresponding to the set function and locating a current position of a terminal according to the navigation start instruction, forming a navigation route according to the current position and the navigation rule. The navigation rule for the set function is set in advance, therefore, the does not need to click and select origin and destination, so that the navigation route may be formed quickly, and navigation time may be saved.

BRIEF DESCRIPTION OF THE DRAWINGS

To describe the technical solutions in the embodiments of the present disclosure more clearly, the drawings that need to be used in the embodiments are briefly introduced. Clearly, the drawings in the following description are merely some embodiments of the present disclosure, and those of ordinary skill in the art may further make modifications and replacements to these drawings without creative efforts.

DETAILED DESCRIPTION OF EMBODIMENTS

The technical solutions in the embodiments of the present disclosure is described clearly and completely below with reference to the accompanying drawings. Evidently, the described embodiments are only some rather than all embodiments of the present disclosure, and are used for explaining the principle of the present disclosure, but are not intended to limit the present disclosure. On the basis of the embodiments in the present disclosure, all other embodiments acquired by those of ordinary skill in the art without creative efforts shall belong to the protection scope of the present disclosure.

First Embodiment

Figure 1:
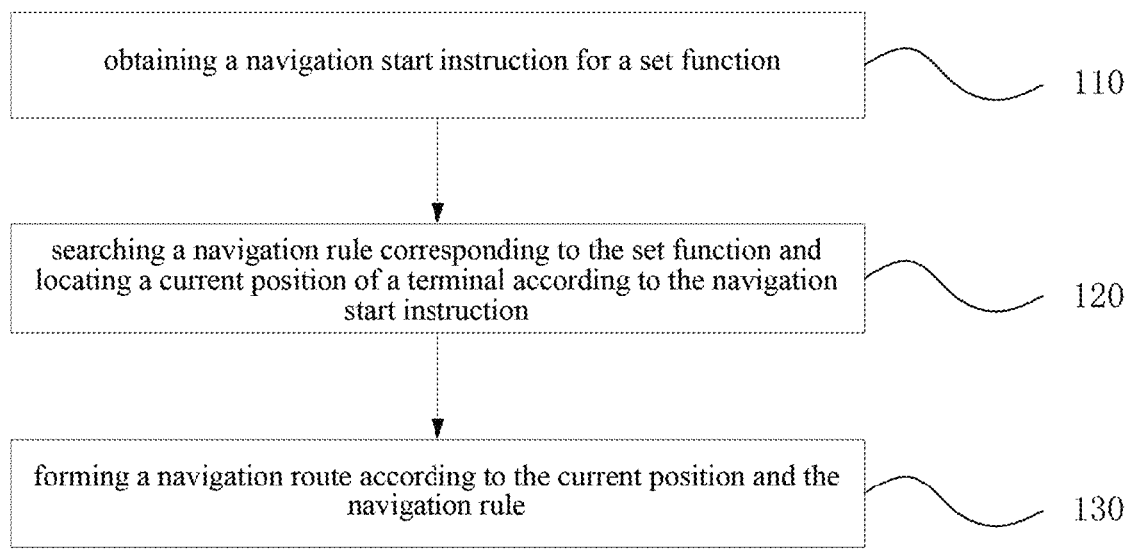
FIG. 1 is a flow chart of a navigation method according to a first embodiment of the present disclosure.

Referring to FIG. 1, showing a flow chart of a navigation method according to a first embodiment of the present disclosure. The embodiment may be suitable for the situation where the user needs to navigate based on the set function. This method may be performed by a navigation apparatus configured in the terminal, and the navigation apparatus may be implemented by software and/or hardware. The method specifically includes the following operations:

S110, obtaining a navigation start instruction for a set function.

The set function refers to any navigation function having a set purpose, such as an emergency evacuation function and a home function. The navigation start instruction for the set function may be input by the user, preferably shortcut input, such as one-touch input and voice input. This navigation start instruction does not require the user inputting complex input information such as origin, destination and navigation strategies.

S120, searching a navigation rule corresponding to the set function and locating a current position of a terminal according to the navigation start instruction.

Different set functions correspond to different navigation rules. When the set function is an emergency evacuation function, the corresponding navigation rule may quickly locate the current position of the terminal, and automatically search all exits in a building where the terminal is located, and simultaneously map out a safe and time-saving emergency evacuation scheme. Specifically, when a fire occurs, the navigation strategy may avoid taking elevators and escalators, and only take the stairs. Alternatively, the navigation strategy may avoid passing through the current dangerous spots. For example, the navigation strategy may divert from the fire spot in case of a fire, or divert from a stampede spot in case of a stampede. When the set function is a home function, the corresponding navigation rule includes locating both the current position of the terminal and the home position, and simultaneously mapping out a home scheme. Specifically, the navigation strategy for returning home may include taking a bus, walking, or driving a car.

The current position refers to the position determined by the terminal using the indoor locating function of the navigation apparatus, and the terminal may be a device such as a cellular phone, or a tablet PC owned by the user.

The indoor locating function refers to that the position may be located in an indoor environment, which is convenient for the user to navigate in the indoor environment. The navigation apparatus in the terminal possesses the indoor locating function.

S130, forming a navigation route according to the current position and the navigation rule.

The navigation apparatus in the terminal combines the current position of the terminal that is determined by using the indoor locating function of the navigation apparatus, and the navigation rule corresponding to the navigation function that has been set up on purpose, to form a navigation route finally.

According to the technical solution in this embodiment, the terminal, by obtaining a navigation start instruction for a set function, searching a navigation rule corresponding to the set function and locating a current position of the terminal according to the navigation start instruction, forms a navigation route according to the current position and the navigation rule. The navigation apparatus in the terminal presets the navigation rule for the set function. Therefore, the user does not need to select origin and destination by clicking, or perform other operations, so that the navigation route may be formed quickly and navigation time can be saved.

Based on the above-mentioned technical solution, preferably, at S110, a navigation start instruction may be entered by a user's clicking on the set button displayed on the navigation interface of the terminal. The advantage of this setup at S110 is that the terminal may quickly obtain the navigation start instruction for the set function through the click on the set button. Specifically, the set button may be an one-touch emergency evacuation button. The user may provide the navigation start instruction for the emergency evacuation function by clicking the one-touch emergency evacuation button, so that the navigation route can be formed quickly, and navigation time can be saved.

Second Embodiment

Figure 2:
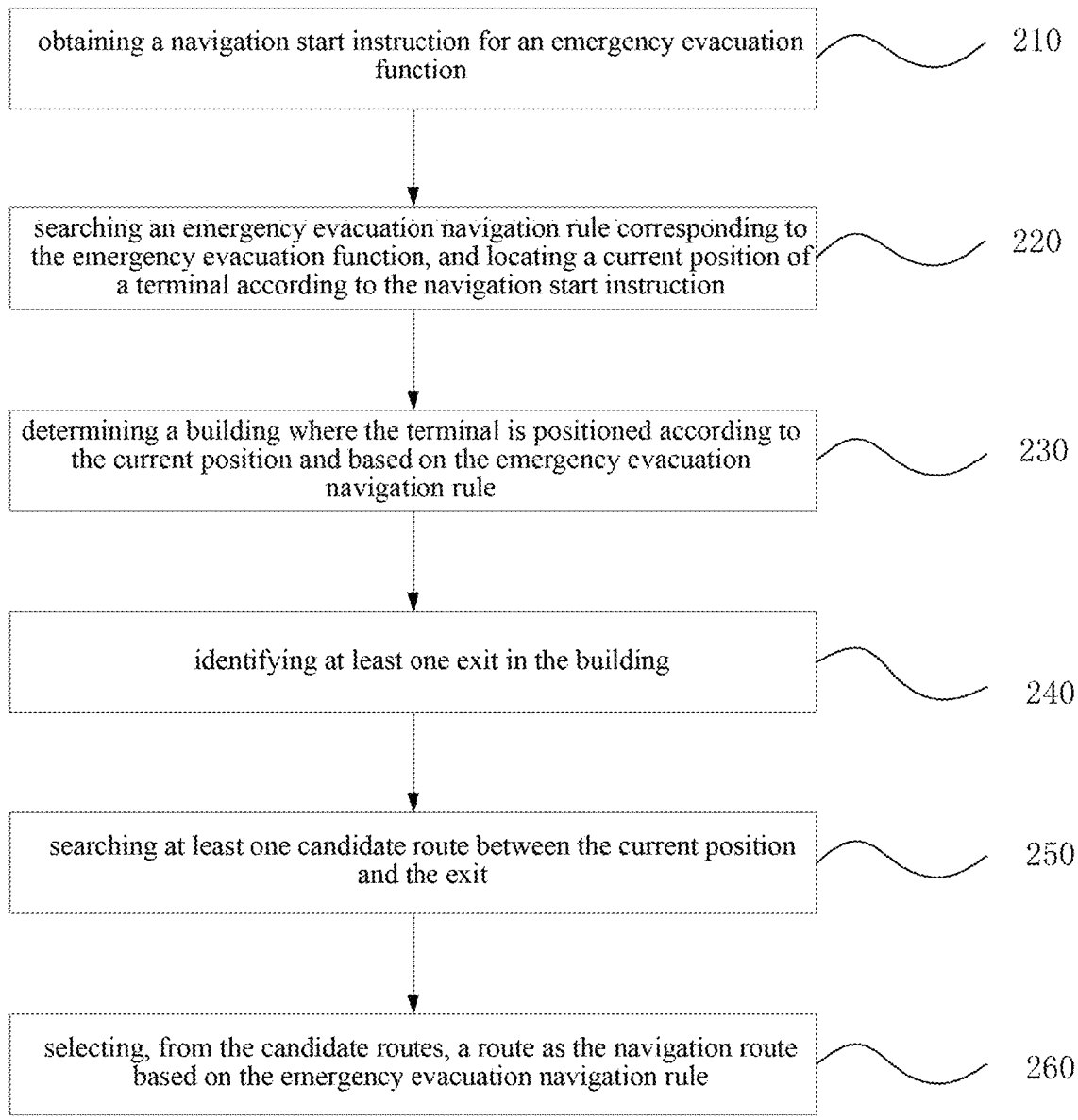
FIG. 2 is a flow chart of a navigation method according to a second embodiment of the present disclosure.

Referring to FIG. 2, which is a flowchart of a navigation method according to a second embodiment of the present disclosure. This embodiment optimizes S130 of the first embodiment on the basis of the first embodiment, and the set function is an emergency evacuation function. Therefore, this embodiment may be suitable for the situation where the user needs to navigate for emergency evacuation. This method specifically includes the following operations:

S210, obtaining a navigation start instruction for an emergency evacuation function.

S220, searching an emergency evacuation navigation rule corresponding to the emergency evacuation function, and locating a current position of a terminal according to the navigation start instruction.

S230, determining a building where the terminal is positioned according to the current position and based on the emergency evacuation navigation rule.

When the set function is an emergency evacuation function, based on the navigation rule for emergency evacuation, the navigation apparatus in the terminal determines the current position of the terminal by using the indoor locating function, and the current position determined by using the indoor locating function may be specific to a floor where the user is positioned, so that the navigation apparatus may determine the building of the terminal based on the floor where the user is positioned.

The indoor locating function refers to the function that a position may be located in an indoor environment to facilitate the user's indoor navigation, and the navigation apparatus in the terminal possesses the indoor locating function.

S240, identifying at least one exit in the building.

The building where the terminal is positioned has a plurality of exits. The plurality of exits in the building where the terminal is positioned are identified by the terminal using the navigation apparatus, here, the building has at least one exit. After finding the exit, the navigation apparatus may map out candidate routes for emergency evacuation according to the current position of the terminal and the exit in the building, so that the navigation apparatus is able to finally determine the navigation route for emergency evacuation.

S250, searching at least one candidate route between the current position and the exit.

The navigation apparatus in the terminal possesses a route planning function. Therefore, after determining the current position of the terminal and the plurality of exits in the building, the terminal may use the route planning function to map out a plurality of candidate routes out of the building, according to the current position of the terminal and the plurality of exits in the building. The user may select a navigation route from the plurality of candidate routes.

S260, selecting, from the at least one candidate route, a route as the navigation route based on the emergency evacuation navigation rule.

The navigation apparatus in the terminal selects a navigation route from the at least one candidate route planned by the navigation apparatus using the route planning function, as an emergency evacuation route, according to the navigation rule corresponding to the emergency evacuation function. The selection is based on a shortest principle or a safest principle, etc.

In the technical solution of this embodiment, the set function is set as an emergency evacuation function. Based on the emergency evacuation navigation rule, the navigation apparatus determines the current position of the terminal by using the indoor locating function. The navigation apparatus determines the building where the terminal is positioned, and the navigation apparatus is used to identify a plurality of exits in the building where the terminal is positioned. Then the terminal uses the route planning function to map out at least one candidate route between the current position and the plurality of exits, and selects a route based on the emergency evacuation navigation rule, from the at least one candidate route as an emergency evacuation route. The terminal determines the building of the terminal by using the indoor locating function of the navigation apparatus, and maps out a plurality of candidate routes out of the building by using the route planning function according to the current position of the terminal and the plurality of exits in the building. At last, the navigation route for emergency evacuation is determined by combining the navigation rule for emergency evacuation, so as to make the selection of the navigation route for emergency evacuation more reliable, faster, and easier to evacuate.

Third Embodiment

Figure 3:
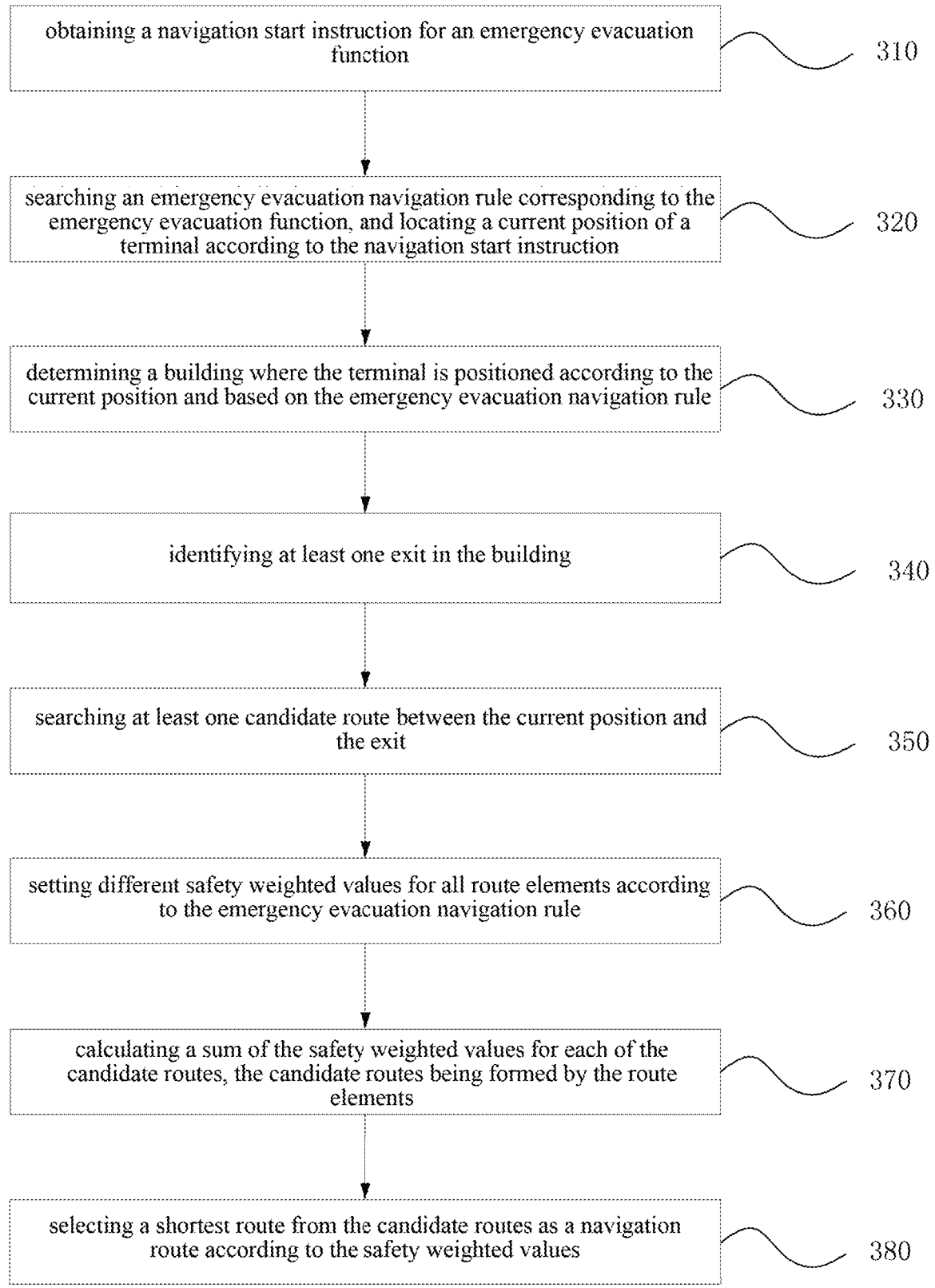
FIG. 3 is a flow chart of a navigation method according to a third embodiment of the present disclosure.

Referring to FIG. 3, which is a flowchart of a navigation method according to a third embodiment of the present disclosure. This embodiment optimizes S260 of the second embodiment on the basis of the above embodiments. This method specifically includes the following:

S310, obtaining a navigation start instruction for an emergency evacuation function.

S320, searching an emergency evacuation navigation rule corresponding to the emergency evacuation function, and locating a current position of a terminal according to the navigation start instruction.

S330, determining a building where the terminal is positioned according to the current position and based on the emergency evacuation navigation rule.

S340, identifying at least one exit in the building.

S350, searching at least one candidate route between the current position and the exit.

S360, setting different safety weighted values for all route elements according to the emergency evacuation navigation rule.

Further, the route elements may include elevators, escalators and stairs, etc. Alternatively, if the navigation route relates to outdoor, the route elements may include other route elements, such as overpasses, or underpasses.

The safety weighted value of the stairs is higher than those of the elevators and escalators. Specifically, when a fire occurs, the elevators and escalators cannot be used to evacuate. Therefore, according to the emergency evacuation navigation rule during a fire, different safety weighted values need to be set for all the route elements. For example, the safety weighted value of the stairs may be set higher, and the safety weighted values of the elevators and escalators may be set lower. For example, the safety weighted value of the elevators may be set to 0, the safety weighted value of the escalators may be set to 0.2, the safety weighted value of the stairs may be set to 1, and the safety weighted value of the stairs which is close to the fire may also be set to 0, and the safety weighted values set like this may exclude the position close to danger. Different route elements are set to different safety weighted values, selecting the route elements which have higher safety weighted values is more helpful to evacuate.

S370, calculating a sum of the safety weighted values for each of the candidate routes, the candidate routes being formed by the route elements.

Specifically, the sum of the safety weighted values of the selected candidate route is obtained according to the route elements forming the route and the safety weighted values of all the route elements. For example, the number of the elevators, escalators and stairs in some candidate route may be counted, then according to the product of the safety weighted values of the elevators, escalators and stairs and their corresponding numbers respectively, the sum of the safety weighted values of the some candidate route is obtained. In the above example, the safety weighted values of all the elevators are the same, the safety weighted values of all the escalators are the same, and the safety weighted values of all the stairs are the same. However, when some stairs are close to the location where the danger happens, and the others are far away from the location where the danger happens, then the safety weighted value of the stairs close to the location where the danger happens is lower, and the safety weighted value of the stairs far away from the location where the danger happens is higher, at this time, the sum of the safety weighted values of some candidate routes are obtained based on the safety weighted value of each of the route elements. Therefore, the sum of the safety weighted values of each candidate route is obtained.

S380, selecting a shortest route from the at least one candidate route as a navigation route according to the safety weighted values.

Based on the sum of the safety weighted values of each of the candidate route, the shortest route may be selected as the emergency evacuation navigation route from the routes having relatively high safety weighted values in the candidate routes. Shorter routes may be also first selected from the at least one candidate route, then the candidate route having higher safety weighted values, is selected as the navigation route for emergency evacuation from the shorter routes.

In the technical solution of this embodiment, different safety weighted values are set for all the route elements according to the emergency evacuation navigation rule, the sum of the safety weighted values of the candidate routes formed by the route elements is calculated, and then the shortest route is selected as a navigation route from the at least one candidate route, according to the safety weighted values. By setting different safety weighted values for all the route elements, and calculating the sum of the safety weighted values of each candidate route based on the safety weighted values of the route elements included in the candidate routes, the route having higher safety weighted value and requiring the shortest time, is selected as the emergency evacuation navigation route from the at least one candidate route. The navigation route formed like this can not only improve the security of emergency evacuation, but also save the emergency evacuation time, and contributes to the successful evacuation.

Fourth Embodiment

Referring to FIGS. 4A-4E, which are figures for concretely executing a navigation method according to a fourth embodiment of the present disclosure, on the basis of the above embodiments. This embodiment is suitable for the situation where the user needs to navigate for emergency evacuation, and provides a preferable embodiment as follows.

Figure 4A:
FIGS. 4A-4E are figures for concretely executing a navigation method according to a fourth embodiment of the present disclosure.

FIG. 4A shows an operation interface of a preferable navigation client. When the user needs the emergency evacuation navigation, the user can find the one-touch emergency evacuation button on the navigation operation interface, and click the button. As shown in FIG. 4A, the one-touch emergency evacuation function is at the bottom of the navigation operation interface.

Figure 4B:
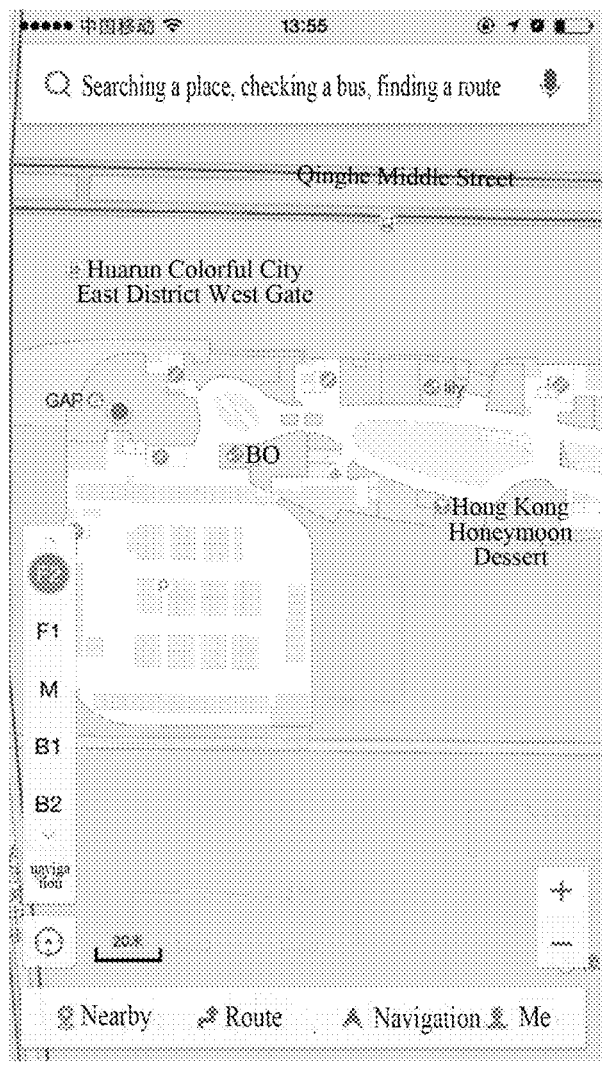

FIG. 4B shows that the user started the navigation function in the terminal by clicking the one-touch emergency evacuation button, at this time, the set function is an emergency evacuation function. After initiating the navigation function, the navigation rule corresponding to the emergency evacuation function is searched automatically, and the current position of the terminal is determined as on a second floor of the building by using the indoor locating function of the navigation apparatus. The floors of the building are displayed on the left side of the navigation apparatus. The position indicated by GAP is the current position of the user terminal.

Figure 4C:
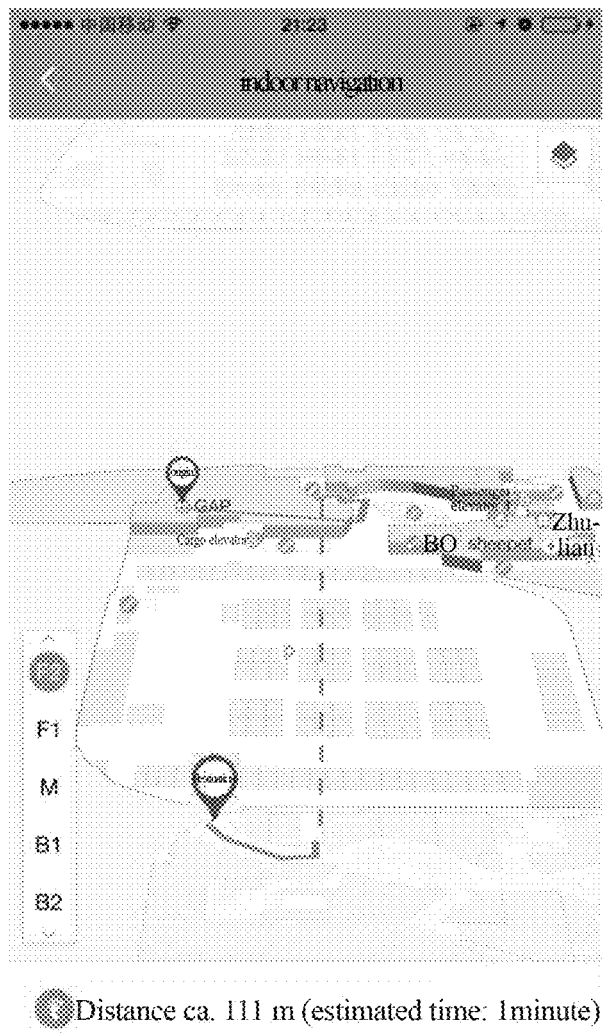

FIG. 4C shows that after the user clicked the one-touch emergency evacuation button, the current position of the terminal is located and the navigation route is formed according to the navigation rule corresponding to the emergency evacuation function. The forming navigation route is displayed on the navigation interface. The entire distance and the time required of the navigation route are displayed on the lower portion of the navigation interface. The floors are displayed on the left of the navigation apparatus, and the current floor of the user is also displayed. As shown in FIG. 4C, the user is still on the second floor of the building.

Figure 4D:
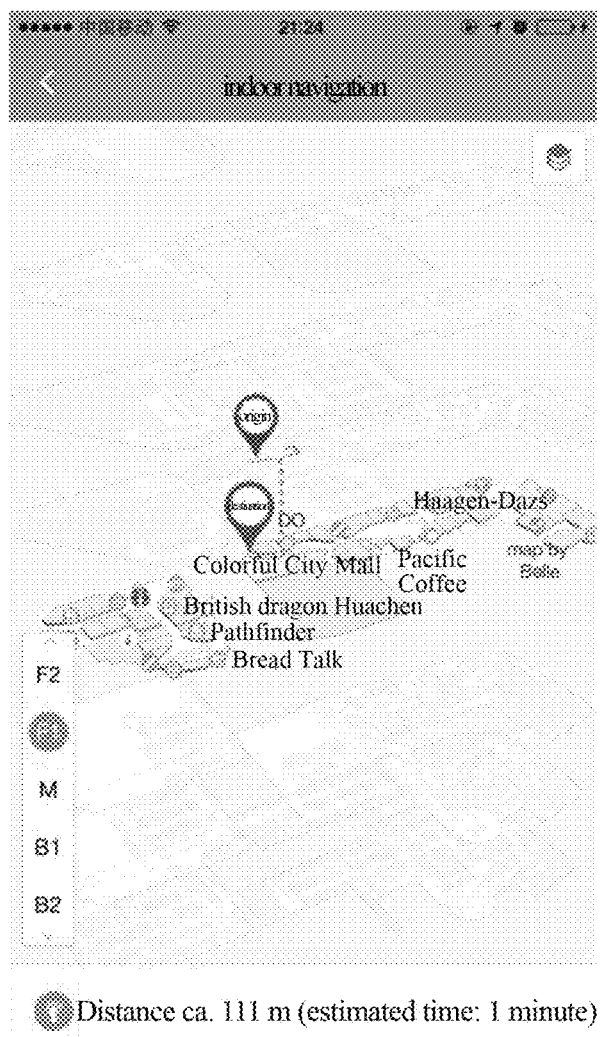

FIG. 4D shows that when the user evacuates according to the navigation route displayed on the navigation apparatus, the navigation operation interface may be switched to the corresponding floor according to the movement of the user. As shown in FIG. 4D, the floor on the left of the navigation operation interface displays that the user has arrived at the first floor of the building.

Figure 4E:
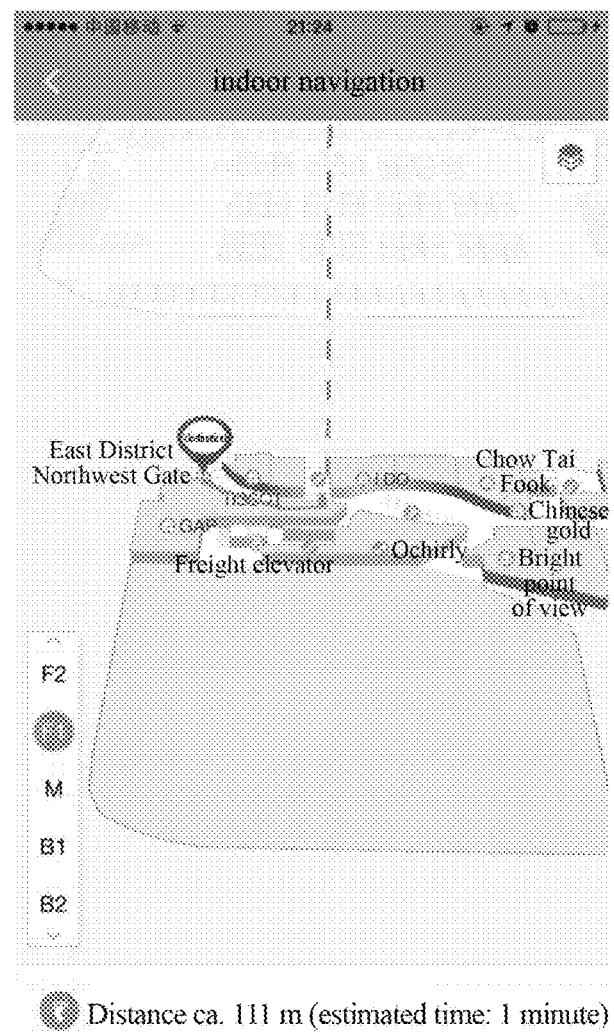

FIG. 4E shows that when the user enlarges the surrounding environment of the destination based on the navigation route provided by the navigation apparatus, the navigation apparatus displays the detailed environment around the destination to the user, enabling the user quickly reaching the destination.

In the technical solution of this embodiment, by clicking the one-touch emergency evacuation button of the navigation apparatus to start the navigation function of the navigation apparatus, searching the navigation rule corresponding to the emergency evacuation function, and determining the current position of the terminal, then the navigation route is formed, and the navigation route is intuitively displayed in front of the user, the corresponding floor is switched based on the movement of the user, meanwhile the surrounding environment of the destination may be enlarged, so that the user understands his position and the environment of the destination in real time, which helps a fast evacuation.

Fifth Embodiment

Figure 5A:
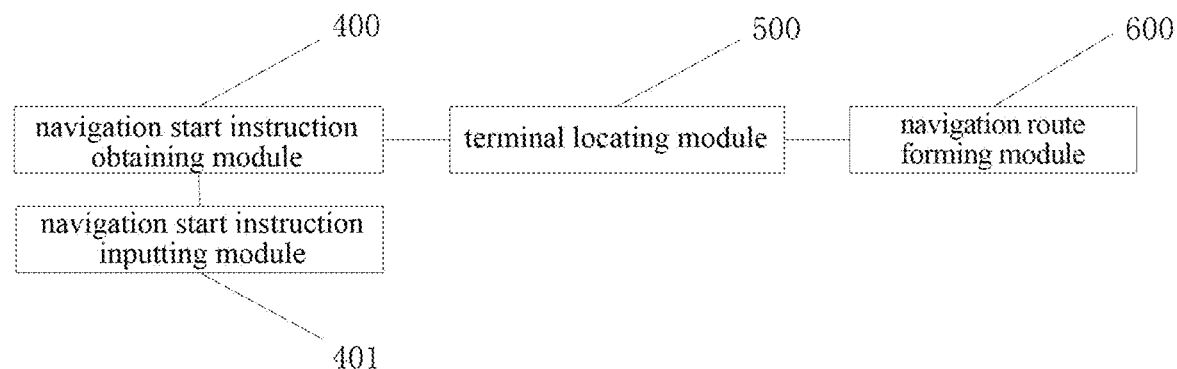
FIG. 5A is a structural block diagram of a navigation apparatus according to a fifth embodiment of the present disclosure.

Referring to FIG. 5A, which is a structural block diagram of a navigation apparatus according to a fifth embodiment of the present disclosure. This embodiment may be suitable for the situation where the user needs to navigate based on the set function, and the navigation apparatus is configured in the terminal, the embodiment specifically comprises the following modules.

A navigation start instruction obtaining module 400 is used for obtaining a navigation start instruction for a set function.

Preferably, the set function may be an emergency evacuation function.

Further, the navigation start instruction obtaining module 400 comprises a navigation start instruction input module 401, which is used for obtaining the navigation start instruction input by the user's clicking on the set button displayed on the navigation interface of the map of the terminal.

A terminal locating module 500 is used for searching a navigation rule corresponding to the set function and locating a current position of a terminal according to the navigation start instruction.

A navigation route forming module 600 is used for forming a navigation route according to the current position and the navigation rule.

Figure 5B:
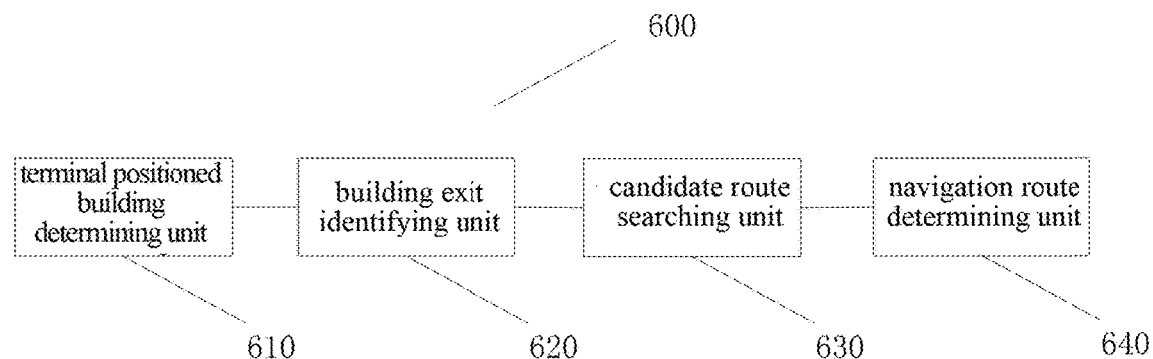
FIG. 5B is a structural block diagram of a navigation apparatus according to the fifth embodiment of the present disclosure.

Referring to FIG. 5B, which is a structural block diagram of a navigation apparatus according to the fifth embodiment of the present disclosure.

As shown in FIG. 5B, preferably, the navigation route forming module 600 comprises:

a terminal positioned building determining unit 610 used by the terminal to determine the building where the terminal is positioned according to the current position based on the emergency evacuation navigation rule;

a building exit identifying unit 620 for identifying at least one exit in the building;

a candidate route searching unit 630 for searching at least one candidate route between the current position and the exit; and a navigation route determining unit 640 for selecting a route as a navigation route from the at least one candidate route based on an emergency evacuation navigation rule.

Figure 5C:
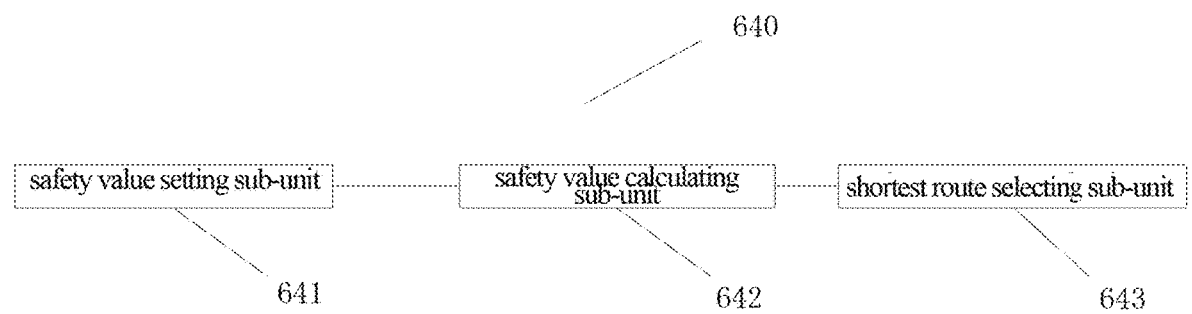
FIG. 5C is a structural block diagram of a navigation apparatus according to the fifth embodiment of the present disclosure.

Referring to FIG. 5C, which is a structural block diagram of a navigation apparatus according to the fifth embodiment of the present disclosure. As shown in FIG. 5C, preferably, the navigation route determining unit 640 comprises the following sub-units.

A safety value setting sub-unit 641 is used for setting different safety weighted values for route elements according to the emergency evacuation navigation rule.

Further, the route elements comprise the elevators, escalators and stairs, and the safety weighted value of the stairs is higher than those of the elevators and escalators.

Specifically, when a fire occurs, the elevators and escalators cannot be used to evacuate, therefore, according to the emergency evacuation navigation rule in a fire emergency, different safety weighted values need to be set for all route elements. For example, the safety weighted value of the stairs may be set higher, and the safety weighted values of the elevators and escalators may be set lower. For example, the safety weighted value of the elevators may be set to 0, the safety weighted value of the escalators may be set to 0.2, the safety weighted value of the stairs may be set to 1, and the safety weighted value of the stairs which is close to the fire may also be set to 0, and the safety weighted values set like this may exclude the position close to danger. Different route elements are set to different safety weighted value, selecting the route elements which have higher safety weighted values is more helpful to evacuate.

A safety value calculating sub-unit 642, is used for calculating a sum of the safety weighted values for each of the candidate routes, the candidate routes being formed by the route elements.

A shortest route selecting sub-unit 643, is used for selecting a shortest route as a navigation route from the at least one candidate route according to the safety weighted values.

The above apparatus may perform the method provided by any embodiment of the present disclosure, and possess functional modules and beneficial effects corresponding to the methods.

Sixth Embodiment

The sixth embodiment of the present disclosure provides a non-volatile computer storage medium, wherein the computer storage medium stores one or more modules, when the one or more modules are executed by a device that performs a navigation method, the device is caused to perform the following operations:

obtaining a navigation start instruction for a set function;

searching a navigation rule corresponding to the set function and locating a current position of a terminal according to the navigation start instruction; and forming a navigation route according to the current position and the navigation rule.

When the modules stored in the above-mentioned storage medium are executed by the device, and the set function is an emergency evacuation function, the forming a navigation route according to the current position and the navigation rule may specifically comprise:

determining a building where the terminal is positioned according to the current position and based on the emergency evacuation navigation rule;

identifying at least one exit in the building;

searching at least one candidate route between the current position and the exit; and selecting, from the at least one candidate route, a route as a navigation route based on an emergency evacuation navigation rule.

When the modules stored in the above-mentioned storage medium are executed by the device, the selecting, from the at least one candidate route, a route as a navigation route based on an emergency evacuation navigation rule, may specifically comprise:

setting different safety weighted values for all route elements according to the emergency evacuation navigation rule.

calculating a sum of the safety weighted values for each of the candidate routes, the candidate routes being formed by the route elements; and selecting a shortest route from the at least one candidate route as a navigation route according to the safety weighted values.

When the modules stored in the above-mentioned storage medium are executed by the device, the route elements may comprise elevators, escalators and stairs, and the safety weighted value of the stairs is higher than the safety weighted values of the elevators and escalators.

When the modules stored in the above-mentioned storage medium are executed by the device, the obtaining a navigation start instruction for a set function, may specifically comprise:

obtaining the navigation start instruction inputted by a user's clicking of a setting button displayed on a navigation interface of the terminal.

Seventh Embodiment

Figure 6:
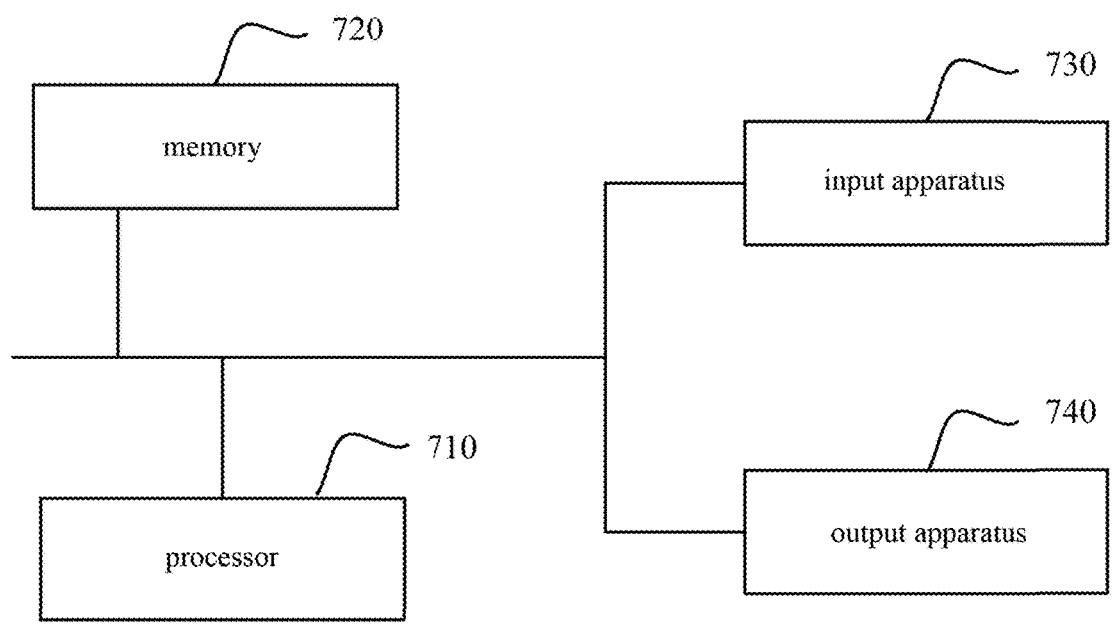
FIG. 6 is a schematic hardware structural diagram of a device for executing a navigation method according to a sixth embodiment of the present disclosure.

Referring to FIG. 6, which is a schematic structural diagram of hardware of a device of a navigation method according to a seventh embodiment of the present disclosure.

The device comprises:

one or more processors 710, one processor 710 being the example in FIG. 6;

a memory 720; and one or more modules.

The device may further comprise: an input apparatus 730 and an output apparatus 740. The processors 710, memory 720, input apparatus 730 and output apparatus 740 may be connected via a bus or other means, the connection via a bus is shown in FIG. 6 as an example.

As a computer readable storage medium, the memory 720 may be used for storing software programs, computer executable programs and modules, for example, program instructions/modules corresponding to the navigation method in the embodiments of the present disclosure (for example, the navigation start instruction obtaining module 400, the terminal locating module 500, the navigation route forming module 600, and the navigation start instruction input module 401 shown in FIG. 5A). The processor 710 runs the software programs, instructions, and modules stored in the memory 720 to execute various functional applications and data processing of a server, so as to implement the navigation methods as discussed in the above method embodiments.

The memory 720 may include a program storage area and a data storage area. The program storage area may store an operating system and an application program for at least one function. The data storage area may store data created according to the use of the terminal apparatus etc. In addition, the memory 720 may include a high speed random access memory, and may further include a non-volatile memory, for example, at least one magnetic disk storage device, a flash memory device, or other non-volatile solid-state storage devices. In some embodiments, the memory 720 may further include memories disposed remote to the processors 710. These remote memories may be connected to the terminal apparatus through a network. Examples of the network include, but not limited to, Internet, an enterprise intranet, a local area network, a mobile communication network, and a combination thereof.

The input apparatus 730 may be used for receiving input digital or character information, and generating key signal inputs related to user settings of the terminal and functional controls. The output apparatus 740 may include a display screen or other display devices.

The one or more modules are stored in the memory 720, and when the one or more modules are executed by the one or more processors 710, the following operations are performed:

obtaining a navigation start instruction for a set function;

searching a navigation rule corresponding to the set function and locating a current position of a terminal according to the navigation start instruction; and forming a navigation route according to the current position and the navigation rule.

Further, the set function is an emergency evacuation function, and the forming a navigation route according to the current position and the navigation rule may specifically comprise:

determining a building where the terminal is positioned according to the current position and based on the emergency evacuation navigation rule;

identifying at least one exit in the building;

searching at least one candidate route between the current position and the exit; and selecting, from the at least one candidate route, a route as a navigation route based on an emergency evacuation navigation rule.

Further, the selecting, from the at least one candidate route, a route as a navigation route based on the emergency evacuation navigation rule, may specifically comprise:

setting different safety weighted values for all route elements according to the emergency evacuation navigation rule.

calculating a sum of the safety weighted values for each of the candidate routes, the candidate routes including the route elements; and selecting a shortest route from the at least one candidate route as a navigation route according to the safety weighted values.

Further, the route elements may comprise elevators, escalators and stairs, and the safety weighted value of the stairs is higher than those of the elevators and escalators.

Further, the obtaining a navigation start instruction for a set function, may comprise:

obtaining the navigation start instruction inputted by a user's clicking of a set button displayed on a navigation interface of the terminal.

According to the descriptions of the above embodiments, one skilled in the art may clearly understand that the present disclosure may be implemented by means of software and necessary general-purpose hardware, and may be implemented, evidently, by means of hardware. However, the former is a preferred implementation in most cases. Based on such an understanding, the technical solutions of the present disclosure, or the parts contributing to the prior art may be essentially embodied in the form of a software product. The computer software product may be stored in a computer readable storage medium, such as a computer floppy disk, a read-only memory (ROM), a random access memory (RAM), a flash, a hard disk, or an optical disk, and includes several instructions for enabling a computer device (which may be a personal computer, a server, a network device, or the like) to execute the method described in each embodiment of the present disclosure.

It should be noted that, in the above embodiments of the navigation apparatus, the referred units and modules are merely divided according to a functional logic, but the present disclosure is not limited to the above division manner, as long as the corresponding functions may be achieved. In addition, the specific names of the functional units are merely used for distinguishing, and are not intended to limit the scope of the present disclosure.

The above descriptions are merely specific embodiments of the present disclosure, and the scope of the present disclosure is not limited thereto. Any changes or replacements that can be easily conceived of by one skilled in the art within the technical scope disclosed by the present disclosure should be covered by the scope of the present disclosure. Therefore, the scope of the present disclosure should be interpreted as the scope sought to be protected by the claims.

What is claimed is:

1. A navigation method, comprising:
   obtaining a navigation start instruction for a set function;
   searching a navigation rule corresponding to the set function, and locating a current position of a terminal in a building according to the navigation start instruction, the building comprising a plurality of floors; and
   forming a navigation route according to the current position and the navigation rule, wherein forming the navigation route comprises:
   identifying at least one exit in the building;
   determining a plurality of candidate routes between the current position and the at least one exit, a candidate route comprising route elements, wherein the route elements comprise elevators and stairs;
   calculating an aggregate safety weighted value for each candidate route, wherein stairs have higher safety weighted values than elevators, and wherein stairs at different positions of the building have different safety weighted values, a stair closer to a location where danger happens having a lower safety weighted value than a stair farther from the location where danger happens; and
   selecting from the plurality of candidate routes a shortest route with an aggregate safety weighted value satisfying a safety threshold as the navigation route,
   wherein the method is performed by one or more processors, and the method further comprises:
   simultaneously displaying the navigation route and a plurality of identifiers indicating the floors on a navigation interface, each of the displayed identifiers indicating a different floor, and a first displayed identifier indicating a first floor where the terminal is located being marked with a symbol; and
   removing the symbol marking the first displayed identifier of the first floor and marking a second displayed identifier indicating a second floor with the symbol on the navigation interface, in response to the terminal moving from the first floor to the second floor.

2. The method according to claim 1, wherein:
   the route elements further comprise escalators, and
   the safety weighted value of the stairs is higher than the safety weighted values of the escalators.

3. The method according to claim 1, wherein the obtaining a navigation start instruction for a set function comprises:
   obtaining the navigation start instruction inputted by a user's clicking of a setting button displayed on a navigation interface of the terminal.

4. The method according to claim 1, further comprising:
   simultaneously displaying the navigation route, the identifiers indicating the floors, a length of the navigation route, and an estimated duration for completing the navigation route.

5. A navigation apparatus, comprising:
a navigation start instruction obtaining module for obtaining a navigation start instruction for a set function;
a terminal locating module for searching a navigation rule corresponding to the set function and locating a current position of a terminal in a building according to the navigation start instruction, the building comprising a plurality of floors;
a navigation route forming module for forming a navigation route according to the current position and the navigation rule, wherein the navigation route forming module comprises:
an exit identification subunit for identifying at least one exit in the building;
a candidate route determination subunit for determining a plurality of candidate routes between the current position and the at least one exit, a candidate route comprising route elements, wherein the route elements comprise elevators and stairs;
a safety value calculation subunit for calculating an aggregate safety weighted value for each candidate route, wherein stairs have higher safety weighted values than elevators, and wherein stairs at different positions of the building have different safety weighted values, a stair closer to a location where danger happens having a lower safety weighted value than a stair farther from the location where danger happens; and
a shortest route selecting subunit for selecting from the plurality of candidate routes a shortest route with an aggregate safety weighted value satisfying a safety threshold as the navigation route; and
a displaying module for simultaneously displaying the navigation route and a plurality of identifiers indicating the floors on a navigation interface, each of the displayed identifiers indicating a different floor, and a first displayed identifier indicating a first floor where the terminal is located being marked with a symbol; and
removing the symbol marking the first displayed identifier of the first floor and marking a second displayed identifier indicating a second floor with the symbol on the navigation interface, in response to the terminal moving from the first floor to the second floor.

6. The apparatus according to claim 5, wherein:
the route elements further comprise escalators, and
the safety weighted value of the stairs is higher than the safety weighted values of the escalators.

7. The apparatus according to claim 5, wherein, the navigation start instruction obtaining module comprises:
a navigation start instruction input module for obtaining a navigation start instruction input by a user's clicking of a setting button displayed on a navigation interface of the terminal.

8. A non-volatile non-transitory computer storage medium, the computer storage medium storing one or more executable instructions that, when executed by a device that performs a navigation method, cause the device to perform following operations:
obtaining a navigation start instruction for a set function;
searching a navigation rule corresponding to the set function and locating a current position of a terminal in a building according to the navigation start instruction, the building comprising a plurality of floors;
forming a navigation route according to the current position and the navigation rule, the forming comprising:
identifying at least one exit in the building;
determining a plurality of candidate routes between the current position and the at least one exit, a candidate route comprising route elements, wherein the route elements comprise elevators and stairs;
calculating an aggregate safety weighted value for each candidate route, wherein stairs have higher safety weighted values than elevators, and wherein stairs at different positions of the building have different safety weighted values, a stair closer to a location where danger happens having a lower safety weighted value than a stair farther from the location where danger happens; and
selecting from the plurality of candidate routes a shortest route with an aggregate safety weighted value satisfying a safety threshold as the navigation route;
simultaneously displaying the navigation route and a plurality of identifiers indicating the floors on a navigation interface, each of the displayed identifiers indicating a different floor, and a first displayed identifier indicating a first floor where the terminal is located being marked with a symbol; and
removing the symbol marking the first displayed identifier of the first floor and marking a second displayed identifier indicating a second floor with the symbol on the navigation interface, in response to the terminal moving from the first floor to the second floor.

9. The storage medium according to claim 8, wherein:
the route elements further comprise escalators, and
the safety weighted value of the stairs is higher than the safety weighted values of the escalators.

10. A device, comprising:
one or more processors;
a memory; and
one or more programs stored in the memory and configured to be, executed by the one or more processors, to cause the one or more processors to perform following operations:
obtaining a navigation start instruction for a set function;
searching a navigation rule corresponding to the set function and locating a current position of a terminal in a building according to the navigation start instruction, the building comprising a plurality of floors;
forming a navigation route according to the current position and the navigation rule wherein forming the navigation route comprises:
identifying at least one exit in the building;
determining a plurality of candidate routes between the current position and the at least one exit, a candidate route comprising route elements, wherein the route elements comprise elevators and stairs;
calculating an aggregate safety weighted value for each candidate route, wherein stairs have higher safety weighted values than elevators, and wherein stairs at different positions of the building have different safety weighted values, a stair closer to a location where danger happens having a lower safety weighted value than a stair farther from the location where danger happens; and
selecting from the plurality of candidate routes a shortest route with an aggregate safety weighted value satisfying a safety threshold as the navigation route;
simultaneously displaying the navigation route and a plurality of identifiers indicating the floors on a navigation interface, each of the displayed identifiers indicating a different floor, and a first displayed identifier indicating a first floor where the terminal is located being marked with a symbol; and removing the symbol marking the first displayed identifier of the first floor and marking a second displayed identifier indicating a second floor with the symbol on the navigation interface, in response to the terminal moving from the first floor to the second floor.

11. The device of claim 10, wherein:

the route elements further comprise escalators, and the safety weighted value of the stairs is higher than the safety weighted values of the escalators.

\* \* \* \* \*